(12) United States Patent
Suzuki et al.

(10) Patent No.: US 6,184,962 B1
(45) Date of Patent: Feb. 6, 2001

(54) LIQUID CRYSTAL DISPLAY DEVICE WITH VISIBLE PERIPHERAL NON-DISPLAY REGION HAVING MASKING SUB-ELECTRODES

(75) Inventors: Masaaki Suzuki, Yokohama; Noriyuki Nakai, Ayase; Hiroki Hiyama, Atsugi, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/035,029

(22) Filed: Mar. 5, 1998

(30) Foreign Application Priority Data

Mar. 5, 1997 (JP) .................................... 9-065602

(51) Int. Cl.[7] .............................................. G02F 1/1343
(52) U.S. Cl. ................................... 349/143; 349/111
(58) Field of Search ................................ 349/143, 148, 349/147, 111, 152

(56) References Cited

U.S. PATENT DOCUMENTS

| 4,728,176 | * | 3/1988 | Tsuboyama et al. | 349/148 |
|---|---|---|---|---|
| 4,773,738 | * | 9/1988 | Hayakawa et al. | 349/143 |
| 4,824,218 | * | 4/1989 | Kuno et al. | 349/148 |
| 5,150,239 | * | 9/1992 | Watanabe et al. | 359/80 |
| 5,282,070 | * | 1/1994 | Nishida et al. | 359/67 |
| 5,285,300 | | 2/1994 | Suzuki et al. | 349/187 |
| 5,381,255 | | 1/1995 | Ohnuma et al. | 349/106 |
| 5,406,398 | | 4/1995 | Suzuki et al. | 349/154 |
| 5,671,030 | | 9/1997 | Ohnuma et al. | 349/106 |
| 5,757,452 | | 5/1998 | Masaki et al. | 349/110 |
| 5,777,707 | | 7/1998 | Masaki et al. | 349/110 |
| 5,858,482 | * | 1/1999 | Ishiwata et al. | 349/157 |

* cited by examiner

Primary Examiner—Kenneth Parker
(74) Attorney, Agent, or Firm—Fitzpatrick, Cella, Harper & Scinto

(57) ABSTRACT

A liquid crystal display device is constituted by a pair of oppositely disposed first and second substrates each having thereon a plurality of transparent stripe-shaped electrodes so that the transparent stripe-shaped electrodes on the first and second substrates intersect each other to form an electrode matrix, each stripe-shaped electrode being provided with a sub-electrode superposed thereon; and a liquid crystal disposed between the first and second substrates so as to provide a plurality of pixels each at an intersection of the stripe-shaped electrodes on the first and second substrates, thereby forming a display region including the pixels and a visible peripheral region surrounding the display region. In the visible peripheral region of the display device, the sub-electrodes on the first and second substrates are extended to mask or light-interrupt the stripe-shaped electrodes and spacings between the stripe-shaped electrodes on the first and second substrates.

8 Claims, 7 Drawing Sheets

LIQUID CRYSTAL DISPLAY DEVICE WITH VISIBLE PERIPHERAL NON-DISPLAY REGION HAVING MASKING SUB-ELECTRODES

FIELD OF THE INVENTION AND RELATED ART

The present invention relates to a liquid crystal display device of a simple matrix-type wherein a plurality of transparent stripe-shaped electrodes of a pair of substrates intersect each other so as to form an electrode matrix for displaying images in a display region surrounded by a visible peripheral or frame-shaped region (visible non-display region).

More specifically, the present invention relates to a liquid crystal display device in which the visible peripheral region is masked or light-interrupted with a material constituting sub-electrodes (auxiliary electrodes) provided to the stripe-shaped electrodes.

In a conventional liquid crystal display device of the simple matrix-type wherein a liquid crystal is disposed between a pair of oppositely disposed substrates each having thereon a plurality of transparent stripe-shaped electrodes arranged in an electrode matrix structure so as to provide a plurality of pixels for image display in a display region. The liquid crystal display device has a visible area defined by a rectangular frame-shaped member (e.g., of a casing for the display device) affixed to the display device, thus providing the display region and a visible peripheral (non-display) region which is in a frame shape and is located between the display region and the frame-shaped member. In the visible peripheral region surrounding the display region of the display device, the transparent stripe-shaped electrodes are not arranged in the electrode matrix and are generally used as lead-out portions each partially provided with a lead wire (metal electrode) extending to an electrode terminal to be connected with an external driving circuit, thus leaving visible lead wire portions since the transparent stripe-shaped electrodes of the pair of substrates in the visible peripheral region are not completely masked or light-interrupted with an opaque member (e.g., metal electrodes as auxiliary electrodes for the transparent stripe-shaped electrodes) due to a remaining exposed portion of the stripe-shaped electrodes and spacings between the stripe-shaped electrodes through which light passes.

In order to mask such a visible peripheral region particularly in the case of a color liquid crystal display device, there has been used a black stripe pattern of a metal film to be generally used for masking spacings between the pixels in the display region, thus preventing partial light transmission (leading to undesirable or unattractive appearance) at four side portions of the visible area corresponding to the visible peripheral region.

Further, in a liquid crystal display device using a liquid crystal having ferroelectricity, there has been adopted a method wherein the matrix electrode structure is provided in the visible peripheral region similarly as in the display region and is electrically connected with a signal-supply circuit so as to always display "black" images in the visible peripheral region by constantly applying signals for the black images, thus improving an external appearance of the display device in the visible peripheral region.

However, the use of the black stripe pattern for masking the visible peripheral region has recently been liable to be relinquished in view of minimization of a degree of surface reflection and reduction of production steps for the display device. Particularly, from the latter viewpoint, the use of the black stripe pattern requires an additional step of forming the pattern in the visible peripheral region. Similarly, a liquid crystal display device for displaying white and black images also encounters this problem (increased production steps).

With respect to the latter method mentioned above (the constant signal application for black images), the method is accompanied with an additional signal circuit therefor, thus leading to increased production costs. In addition, such a constant signal application in the visible peripheral region is liable to apply an undesirable load to display signals to be supplied to a given matrix electrode portion for display in the display region.

SUMMARY OF THE INVENTION

In view of the above-mentioned problems, an object of the present invention is to provide a liquid crystal display device effectively masking or light-interrupting a visible peripheral region enclosing a display region without impairing an external appearance or a quality in the visible peripheral region.

Another object of the present invention is to provide a liquid crystal device wherein the masking of the visible peripheral region can be performed with no additional production steps.

According to the present invention, there is provided a liquid crystal display device, comprising:

a pair of oppositely disposed first and second substrates each having thereon a plurality of transparent stripe-shaped electrodes so that the transparent stripe-shaped electrodes on the first and second substrates intersect each other to form an electrode matrix, each stripe-shaped electrode being provided with a sub-electrode superposed thereon, and a liquid crystal disposed between the first and second substrates so as to provide a plurality of pixels each at an intersection of the stripe-shaped electrodes on the first and second substrates, thereby forming a display region including the pixels and a visible peripheral region surrounding the display region, wherein in the visible peripheral region, the sub-electrodes on the first and second substrates are extended to mask the stripe-shaped electrodes and spacings between the stripe-shaped electrodes on the first and second substrates.

According to the present invention, there is also provided a liquid crystal display device, comprising:

a pair of oppositely disposed first and second substrates each having thereon a plurality of transparent stripe-shaped electrodes so that the transparent stripe-shaped electrodes on the first and second substrates intersect each other to form an electrode matrix, each stripe-shaped electrode being provided with a sub-electrode superposed thereon, and a liquid crystal disposed between the first and second substrates so as to provide a plurality of pixels each at an intersection of the stripe-shaped electrodes on the first and second substrates, thereby forming a display region which includes the pixels and a visible peripheral region which surrounds the display region and includes, on at least one of the first and second substrates, a masking metal layer isolated from associated transparent stripe-shaped electrodes on the first and second substrates; wherein in the display region, the pixels are arranged to leave pixel spacings therebetween which are masked with at least the sub-electrodes on the first and second substrates, and in the visible peripheral region, the sub-electrodes on the first and second substrates are extended to mask the stripe-shaped electrodes and spacings between the stripe-shaped electrodes on the first and second substrates.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A–3C are respectively an enlarged plan view of an upper-left portion of the display device shown in FIG. 2 wherein FIG. 3A shows an electrode arrangement formed by transparent stripe-shaped electrodes and sub-electrodes of a pair of substrates; FIG. 3B shows an electrode arrangement on one of the substrates; and FIG. 3C shows an electrode arrangement on the other substrate.

DETAILED DESCRIPTION OF THE PREFERRED EMBODIMENTS

In the liquid crystal display device according to the present invention, a pair of oppositely disposed substrates is each provided with a plurality of transparent stripe-shaped electrodes (as display electrodes) (hereinafter referred to as "stripe electrodes") arranged in an electrode matrix where the stripe electrodes of the pair of substrates intersect each other to provide a plurality of pixels each at an intersection thereof.

The liquid crystal display device has a display region where image display is performed by using the electrode matrix and a visible peripheral region (non-display region where the image display is not performed due to the absence of the electrode matrix) in a frame shape surrounding the display region.

The liquid crystal display device according to the present invention is characterized by an arrangement of sub-electrodes (as auxiliary electrodes for the stripe electrodes of the pair of substrates) covering and masking (light-interrupting) the stripe electrodes and spacings therebetween of the pair of substrates in the visible peripheral region of the display device.

In a preferred embodiment, the sub-electrodes are used in combination with at least one masking metal layer separated or isolated from the stripe electrodes on at least one of the pair of substrate for masking the visible peripheral region.

Figure 1:
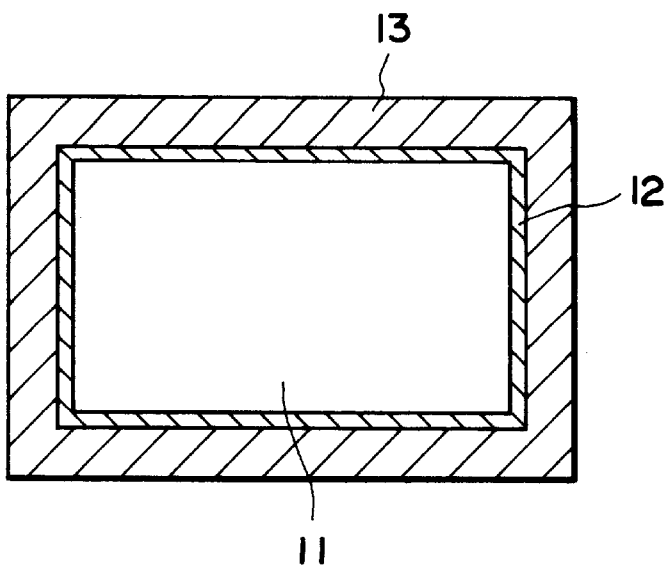
FIG. 1 is a schematic plan view of an embodiment of a liquid crystal display device according to the present invention.

FIG. 1 shows an embodiment of the liquid crystal display device of the present invention.

Referring to FIG. 1, the liquid crystal display device has a rectangular display region 11 and a rectangular frame-shaped visible peripheral region 12 enclosing the display region 11.

Outside the visible peripheral region 11, a rectangular frame-shaped outer plate 13 is disposed so as to define a visible area of the display device.

In the visible peripheral region, the stripe electrodes and spacings therebetween on the pair of substrates are light-interrupted or masked with a combination of the sub-electrodes superposed on the respective stripe electrodes. Specifically, on each substrate in the visible peripheral region, the stripe electrodes of the substrate are completely coated for masking thereof with the sub-electrodes and the spacings between the stripe electrodes are light-interrupted by a sub-electrode pattern of the other sub-electrodes formed on the other substrate so as to completely overlap the spacings in a direction of light transmission, thus achieving the light-interruption of the stripe electrodes and the spacings therebetween with respect to the pair of substrates as a whole.

In the case where the visible peripheral region of the display device further includes at least one remaining light-transmission portion therein, the portion may preferably be light-interrupted by forming at least one masking metal layer on either one or both of the pair of substrates, thus substantially masking the visible peripheral region.

In the present invention, the sub-electrodes may preferably be metal electrodes of a metallic material, such as molybdenum (Mo), an alloy of Mo and another metal, aluminum (Al) or an allow of Al and anther metal.

The masking metal layer may preferably comprise a metallic material identical to that of the sub-electrodes.

In a preferred embodiment, the masking metal layer and the sub-electrodes are formed at the same time in a common step for producing the liquid crystal display device with respect to at least one of the pair of substrates.

In a more preferred embodiment, on one of the substrates (first substrate), the sub-electrodes (auxiliary electrodes) are formed in a prescribed pattern on the stripe electrodes (display electrodes) in order to decrease an electric resistance of the stripe electrodes. Specifically, on the stripe electrodes, the sub-electrodes are formed so that the sub-electrodes cover or contacts the stripe electrodes from one longitudinal end to the other longitudinal end of the stripe electrode while leaving an extended portion under which no stripe electrodes are disposed but overlap spacings between opposite stripe electrodes (of the second substrate) and also leaving exposed portions of the stripe electrodes (of the first substrate). The exposed portions comprise a terminal portion connected with an external driving unit (device) outside the visible peripheral region and pixel portions subjected to image display in the display region. In the visible peripheral region on the same (first) substrate, if a portion where the stripe electrodes are not formed is present (e.g., at four corners of the visible peripheral region), the masking metal layer comprising an identical material to the sub-electrodes is formed simultaneously with the sub-electrodes in a common (photolithographic) step so as not to adversely affect the stripe electrodes, preferably so as to be electrically isolated from the stripe electrodes.

On the other (second) substrate, the sub-electrodes are formed on the associated stripe electrodes similarly as in the first substrate. Further, the masking metal layer was also formed in the same manner as in that for the first substrate, as desired. As a result, in the visible peripheral region, the stripe electrodes on the first and second substrates and the spacings between the stripe electrodes are substantially masked (light-interrupted) by the combination of the sub-electrodes on the first and second substrates. Further, the visible peripheral region of the liquid crystal display device is placed in a uniform or homogeneous masked state (where transmission of light from a light source (e.g., a backlight unit) disposed behind the display device is substantially suppressed) by the combination of the sub-electrodes on the first and second substrates and the additional masking metal layer(s), as desired.

On the other hand, in the display region, pixel spacings between the plurality of pixels each at an intersection of the stripe electrodes of the first and second substrates are almost masked with the combination of the sub-electrodes on the first and second substrates.

The liquid crystal display device of the present invention includes a liquid crystal disposed between the pair of (first and second) substrates. The liquid crystal may preferably be a chiral smectic liquid crystal assuming at least two stable states. The chiral smectic liquid crystal may be a liquid crystal having ferroelectricity.

In the liquid crystal display device, at least one of the first and second substrate is provided with an alignment film. Either one or both of the thus formed alignment films may be subjected to a uniaxial aligning treatment (e.g., a rubbing treatment in one direction). For instance, the first and second substrates may be provided with a uniaxially aligned alignment film and an alignment film subjected to the uniaxial aligning treatment as desired, respectively. The first substrate may be provided with a uniaxially aligned alignment film and the second substrate may be provided with no alignment film in another instance.

Hereinbelow, the present invention will be described more specifically based on more preferred embodiments of the liquid crystal display device employing the above-described electrode arrangement with reference to FIGS. 2–6.

A first preferred embodiment of the display device will be described with reference to FIGS. 2–5.

Figure 2:
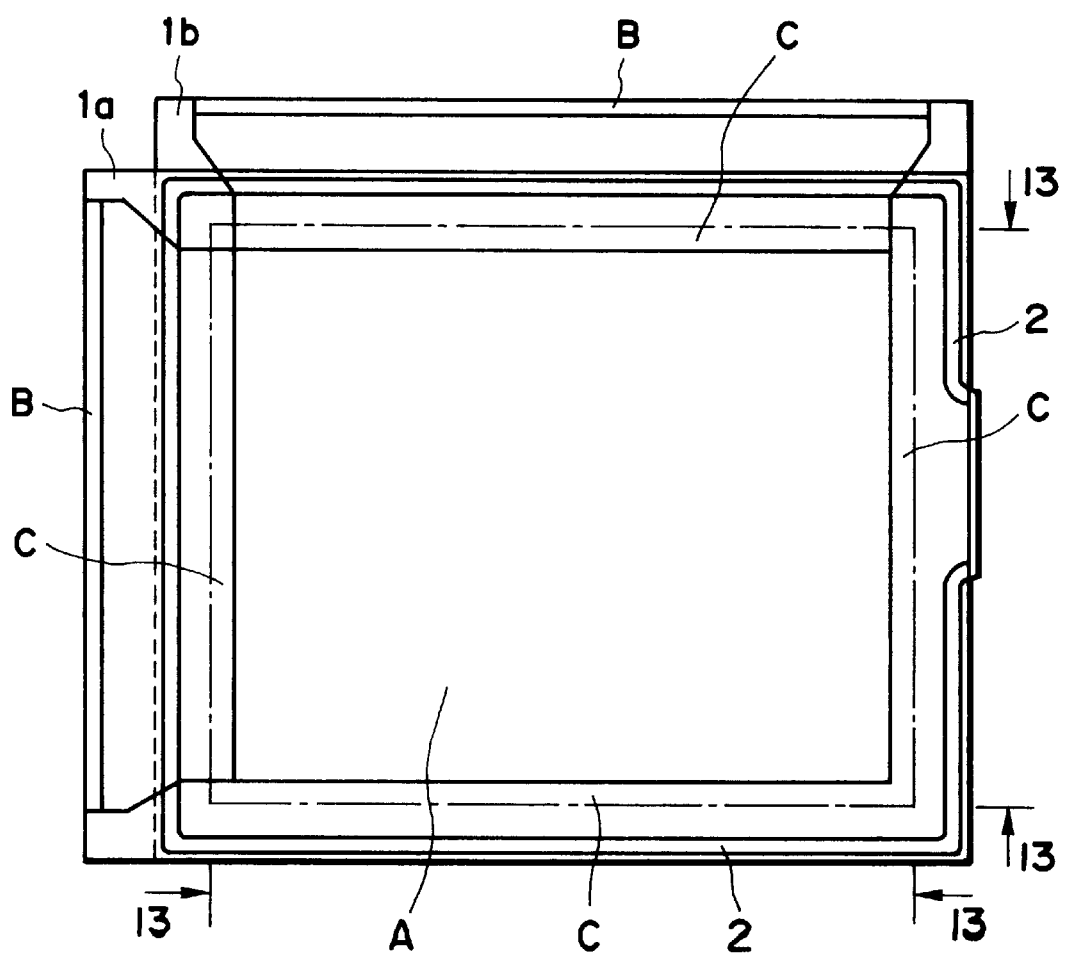
FIG. 2 is a plan view showing an embodiment of a structure of a liquid crystal display device of the present invention.

FIG. 2 is a schematic plan view showing a positional relationship between a pair of substrates and showing respective regions and a peripheral structure.

Hereinafter, identical reference numerals are used for describing identical structural members or regions through FIGS. 2–6, respectively, unless otherwise noted specifically.

Referring to FIG. 2, the liquid crystal display device of the present invention includes a first (upper) substrate 1a and a second (lower) substrate 1b disposed opposite to the first substrate 1a. At the periphery of the first and second substrates 1a and 1b a sealing agent 2 is disposed so as to leave a liquid crystal injection port on the right-hand side through which a liquid crystal (not shown) is injected and filled.

The liquid crystal display device has a display region A and a visible peripheral region C surrounding the display region A. Outside the visible peripheral region C, an outer frame-shaped plate 13 is disposed and under which terminal portions B, of respective stripe electrodes (not shown), for electrically connecting an external driving unit (not shown) are located.

Figure 3A:
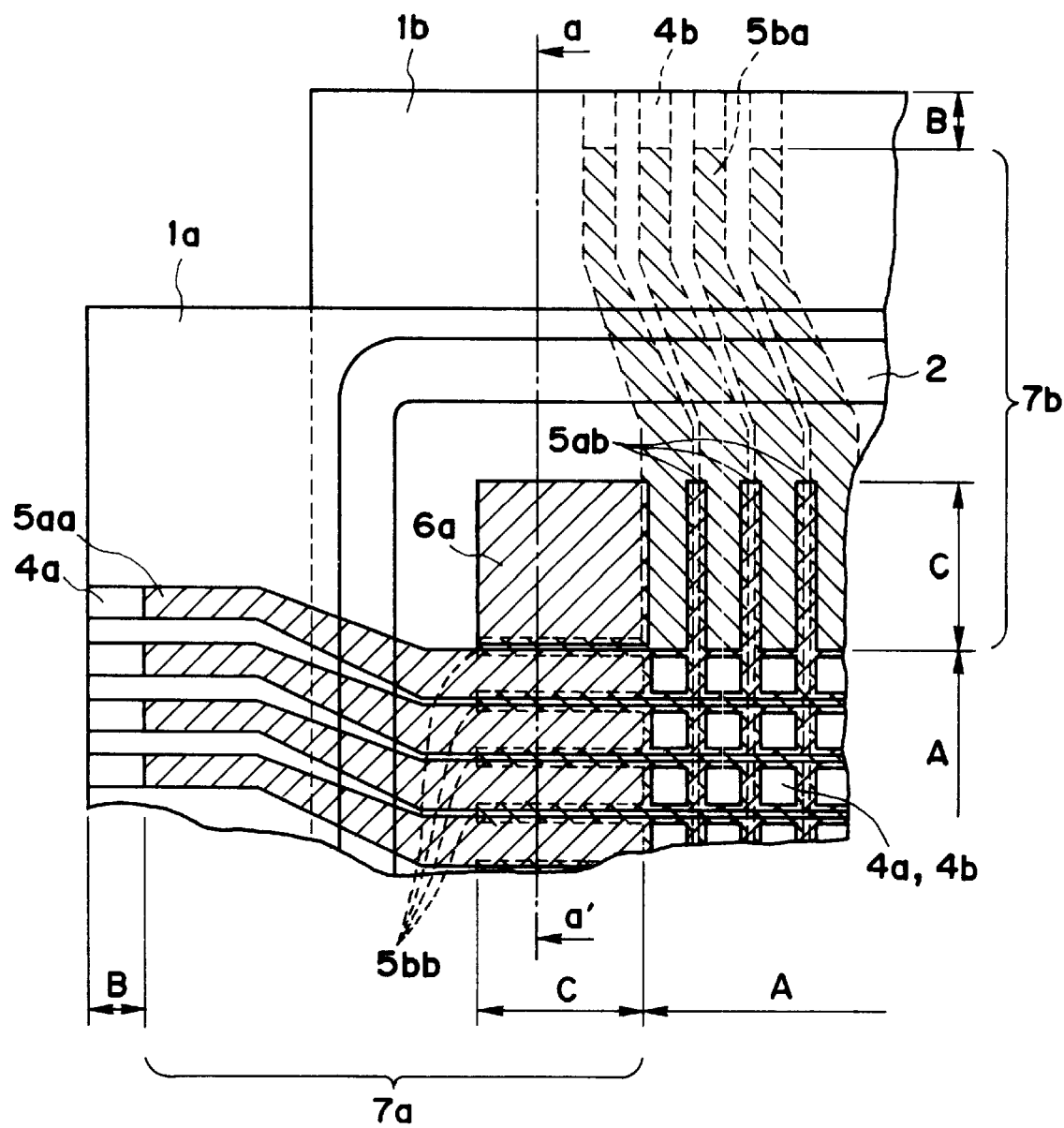
Figure 3B:
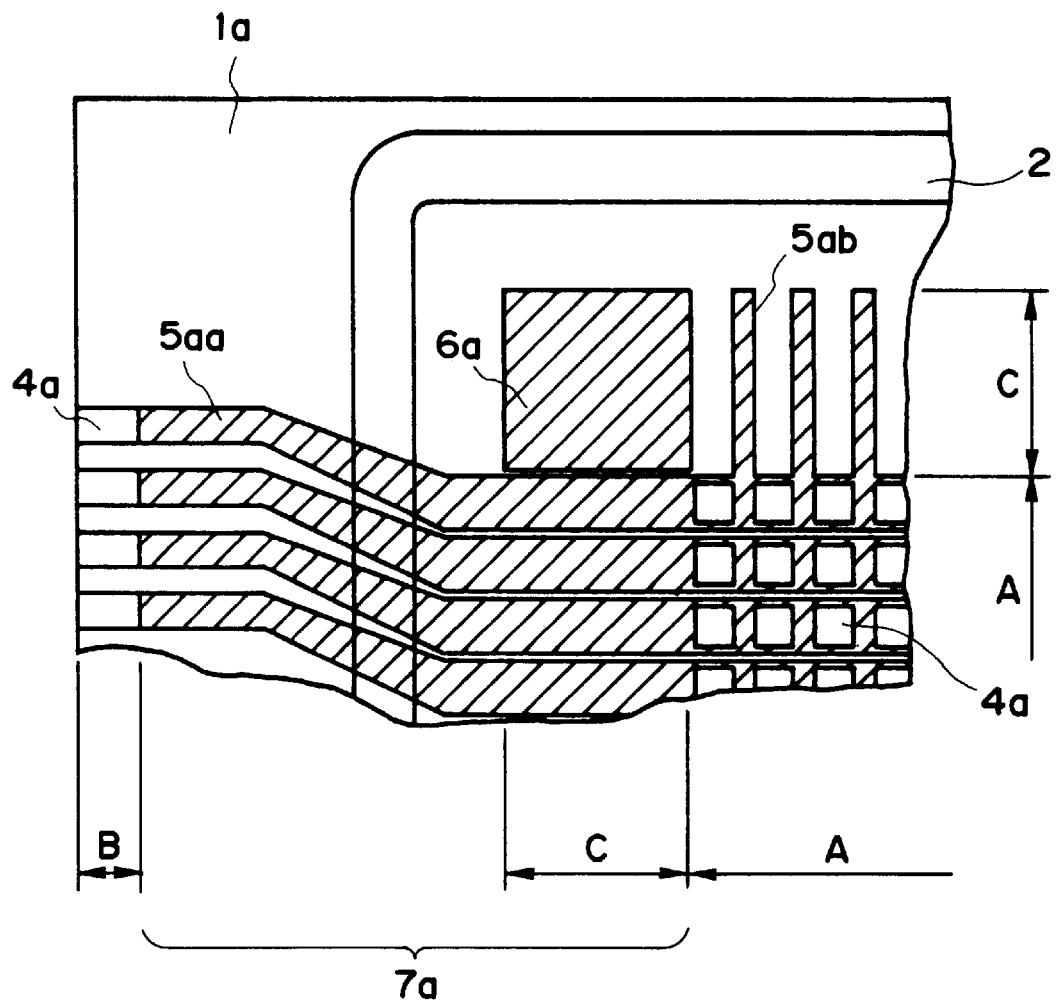
Figure 3C:
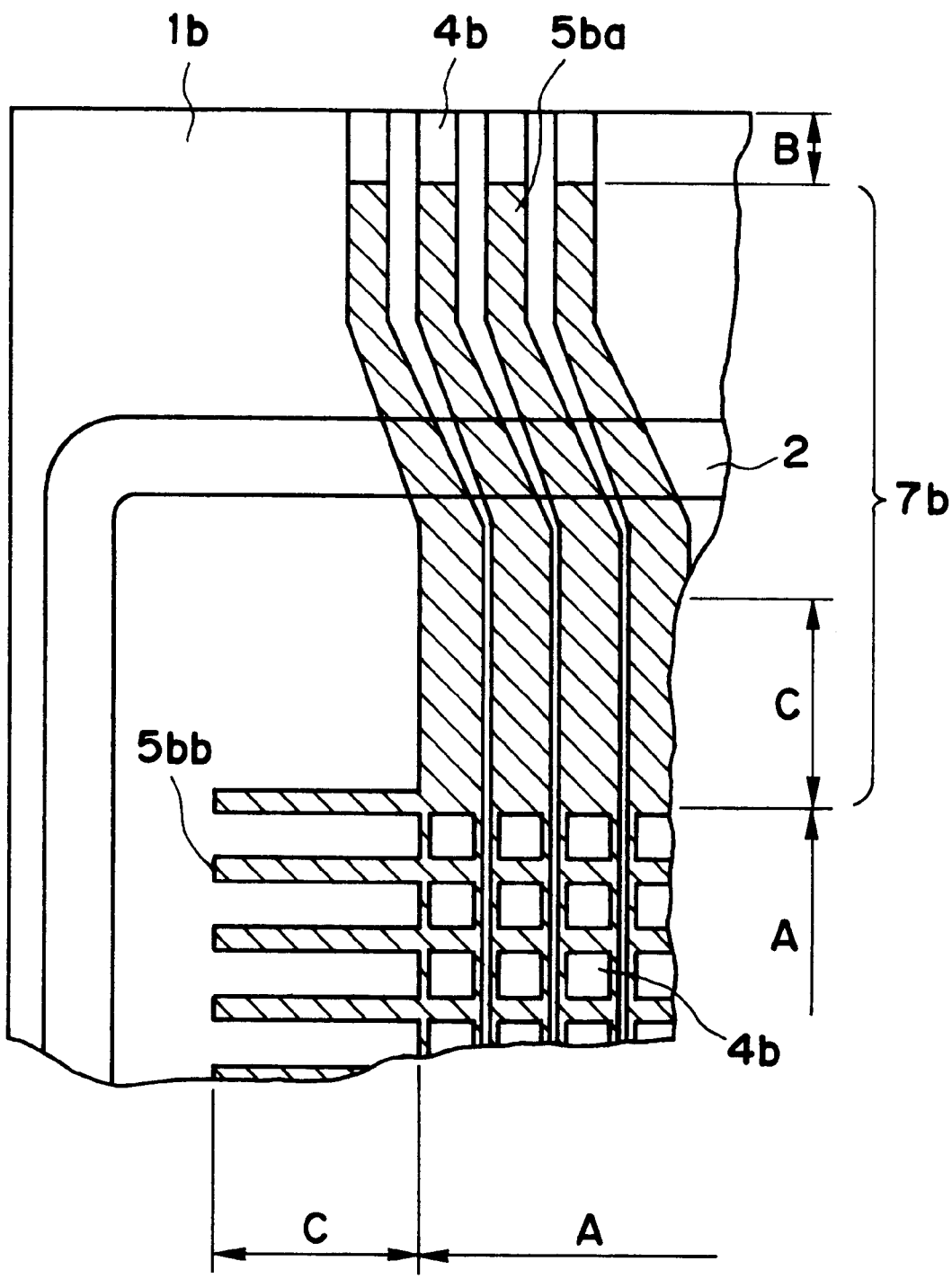

FIGS. 3A–3C are enlarged plan views of an upper left portion of the display device shown in FIG. 2.

FIG. 3A shows an electrode arrangement of stripe electrodes (4a and 4b) and sub-electrodes (5aa, 5ab, 5ba and 5bb) on the first and second substrate 1a and 1b, FIG. 3B shows that on the first substrate 1a, and FIG. 3C shows that on the second substrate 1b.

Referring to FIG. 3B, on the first substrate 1a, stripe electrodes (transparent stripe-shaped electrodes) 4a are masked with sub-electrodes 5aa formed on the stripe electrodes 4a while leaving a part of stripe electrodes 4a at the terminal portion B and rectangular pixel portions 4a in the display region A. In the visible peripheral region C, one of the sub-electrodes 5aa is extended so as to provide extended portions 5ab overlapping spacings between opposite stripe electrodes 4b shown in FIG. 3A. At the corner of the visible peripheral region C, a masking metal layer 6a are disposed so as to mask a remaining portion where the stripe electrodes 4a and 4b are not formed.

Similarly, as shown in FIG. 3C, on the second substrate 1b, the stripe electrodes 4b and spacings between the opposite stripe electrodes 4a (on the first substrate 1a shown in FIG. 3B) are masked with sub-electrodes 5ba provided with extended portions 5bb, thus substantially mask the visible peripheral portion C by the combination of the sub-electrodes 5aa, 5ab, 5ba and 5bb and the masking metal layer 6a as shown in FIG. 3A.

In FIGS. 3A–3B, each of regions 7a and 7b corresponds to lead-out portions of the stripe electrodes between the display region A and the terminal portions B.

Figure 4:
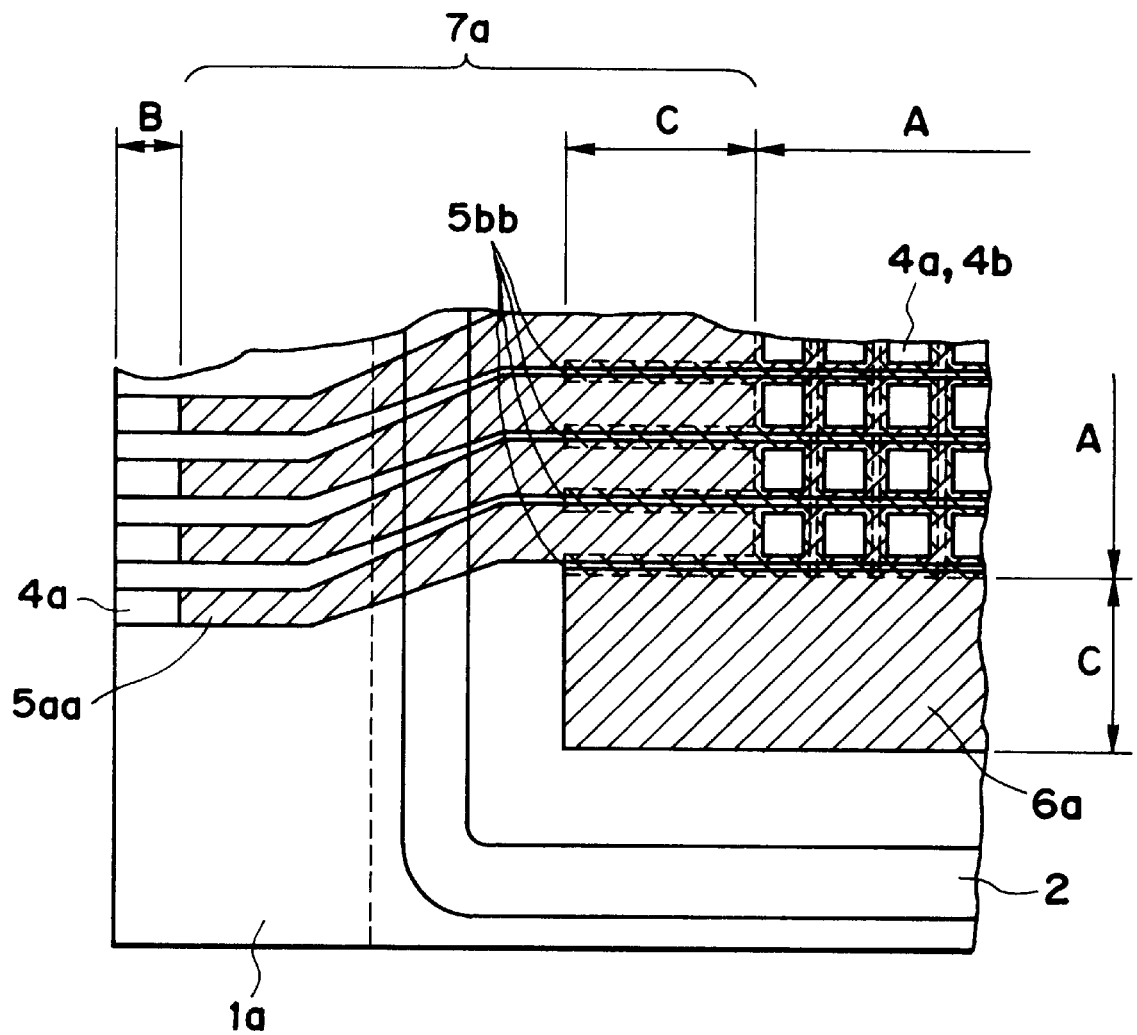
FIG. 4 is an enlarged plan view of a lower-left portion, of the display device shown in FIG. 2, showing an electrode arrangement thereat.

FIG. 4 shows an enlarged plan view showing an electrode arrangement of a lower left portion of the display device shown in FIG. 2.

At this portion, the masking of the visible peripheral region is performed by the combination of the sub-electrodes 5aa and 5bb and the masking metal layer 6a similarly as in the upper left portion (FIG. 3A).

In a similar manner, remaining portions in the visible peripheral portion C of FIG. 2 (not shown in FIGS. 3A–3C) are masked with the sub-electrodes and masking metal layer(s) in combination, thus allowing the entire masking in the visible peripheral region C.

Figure 5:
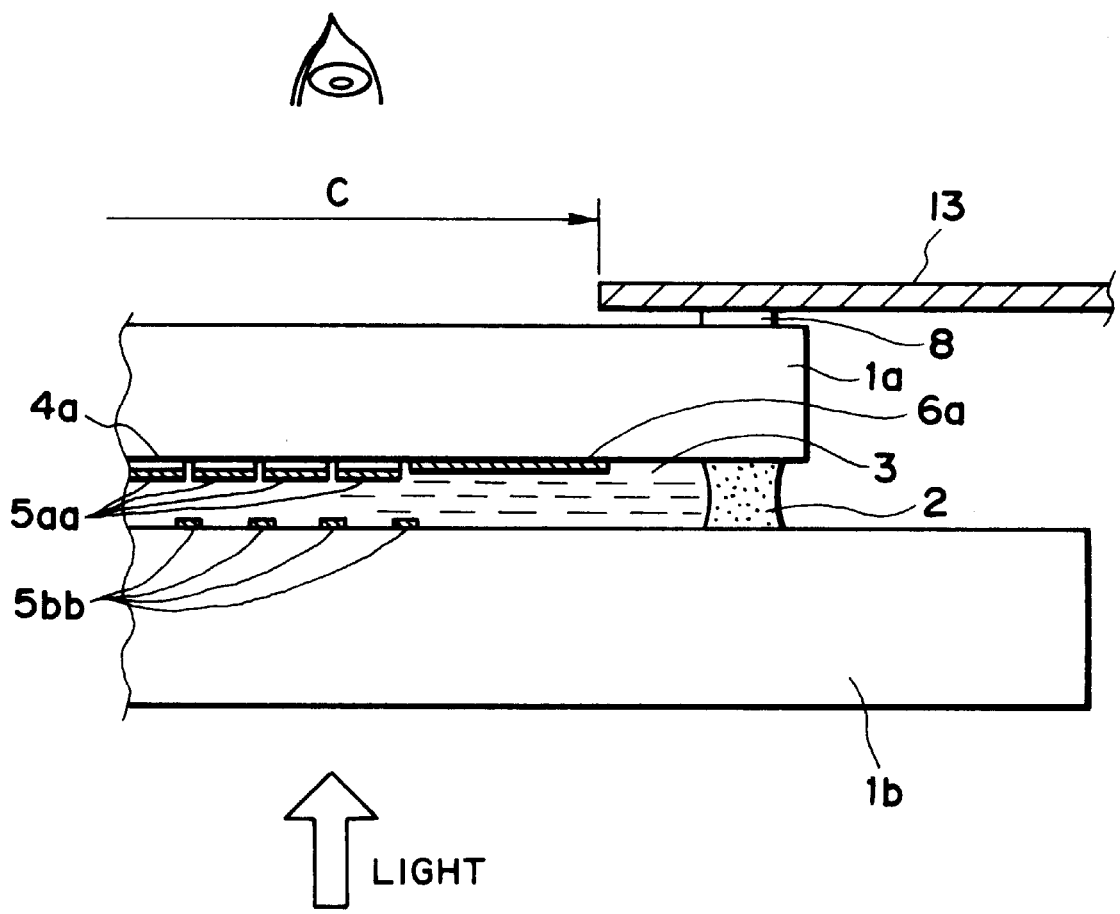
FIG. 5 is a schematic sectional view taken along a–a' line shown in FIG. 3A.

FIG. 5 is a schematic sectional view for illustrating a structure of the display device of FIG. 2 when taken along a–a' line shown in FIG. 3A.

Referring to FIG. 5, a layer of a liquid crystal 3 is disposed between the first and second substrates 1a and 1b. The outer frame-shaped plate 13 is connected with the first substrate 1a via an (elastic) adhesive 8. In the visible peripheral region C, light from the outside of the second substrate 1b is interrupted or shielded by the use of the sub-electrodes 5aa and 5ab and the masking metal layer 6a in combination.

In the above-described display device shown in FIGS. 2–5, each substrate (1a, 1b) comprises, e.g., a glass substrate and disposed opposite to each other. At the periphery of the substrates 1a and 1b, a sealing agent 2 of, e.g., epoxy adhesive is disposed so as to surround a region including the display region A and visible peripheral region C while leaving an injection portion for the liquid crystal 3. Each of the substrates 1a and 1b is provided with a plurality of stripe electrodes (transparent stripe-shaped electrodes) 4a and 4b of, e.g., indium-tin oxide (ITO), respectively. Each of the stripe electrodes 4a (4b) may be formed in a prescribed thickness (e.g., ca. 700 Å) and width (e.g., 35–330 μm) by a sputtering over an entire surface of the substrate 1a (1b), followed by patterning into a prescribed (stripe) shape through a photolithographic (-etching) process. Each of the stripe electrodes 4a (4b) extends from one side of the substrate 1a (1b), in the vicinity of which the terminal portion B (for external connection) is located as shown in, e.g., FIGS. 3A–3C, to one end of the display region A toward the other side of the substrate 1a (1b) as shown in FIG. 4.

The thus formed stripe electrodes 4a and 4b intersect each other to form an electrode matrix in the display region A, thus providing a plurality of pixels each at an intersection of the stripe electrodes 4a and 4b.

In the present invention, the liquid crystal display device may generally be designed to have the display region A of 5–20 inches in diagonal length or 160×120 mm to 320×240 mm in size, the visible peripheral region C of 3–5 mm in width and the terminal portion B of 2–3 mm in length On each substrate 1a (1b), the stripe electrodes 4a (4b) are provided or masked with the sub-electrodes 5aa and 5ab (5ba and 5bb) of, e.g., a ca. 1000 Å-thick metal layer (e.g., Mo layer) as shown in FIG. 3B (FIG. 3C) in order to decrease the electric resistance of the stripe electrodes 4a (4b).

For instance, as shown in FIG. 3B, the stripe electrodes 4a on the (first) substrate 1a are partially coated with the sub-electrodes 5aa so as to leave exposed pixel portions 4a in the display region A and are completely coated with the sub-electrodes 5aa at a lead-out portion 7a including the visible peripheral region C (left portion thereof). At the terminal portion B, the stripe electrodes 4a are not coated with the sub-electrodes 5aa, thus exposing a portion for connecting the external driving unit.

One of the sub-electrodes 5aa on the stripe electrodes 4a is provided with a plurality of extended portions 5ab arranged so as to overlap the spacings between the opposite stripe electrodes 4b on the other (second) substrate 1b in the visible peripheral region C (upper portion thereof) as shown in FIGS. 3A and 3B.

On the other hand, as shown in FIG. 3C, the stripe electrodes 4b on the (second) substrate 1b are partially coated with the sub-electrodes 5ba so as to leave exposed pixel portions 4b in the display region A and are completely coated with the sub-electrodes 5ba at a lead-out portion 7b including the visible peripheral region C (upper portion thereof). At the terminal portion B, the stripe electrodes 4b are not coated with the sub-electrodes 5ba, thus exposing a portion for connecting the external driving unit.

One of the sub-electrodes 5ba on the stripe electrodes 4b is provided with a plurality of extended portions 5bb arranged so as to overlap the spacings between the opposite stripe electrodes 4a on the other (first) substrate 1a in the visible peripheral region C (left portion thereof) as shown in FIGS. 3A an 3C.

In the present invention, on at least one of the substrates 1a and 1b, at least one masking metal layer preferably arranged to be electrically separated from the associated stripe electrodes 4a (4b) and sub-electrodes 5aa and 5ab (5ba and 5bb) may be formed so as to mask a remaining light-transmission portion to be masked in the visible peripheral region C where no sub-electrodes 5aa, 5ab, 5ba and 5bb on the first and second substrates 1a and 1b are formed.

Specifically, as shown in FIGS. 3A, 3B and 4, the remaining light-transmission portion comprises a masking metal layer 6a disposed at the corner of the visible peripheral region C as shown in FIGS. 3A and 3B and a masking metal layer 6a disposed at a portion opposite to the lead-out portion 7b (7a) as shown in FIG. 4, thus masking the entire visible peripheral region C of the resultant liquid crystal display device by the masking metal layers 6a in combination with the sub-electrodes 5aa, 5ab, 5ba and 5bb on the first and second substrates 1a and 1b as shown in FIGS. 3A and 4.

In the present invention, the masking metal layers 6a and the sub-electrodes 5aa and 5ab may preferably be formed of an identical material (e.g., Mo or Al) in a common step at the same time. Specifically, on the entire surface of the first substrate 1a (provided with the stripe electrodes 4a), a layer of a metal material (e.g., a 1000 Å-thick Mo layer) may be formed by sputtering, followed by a photolithographic(-etching) process to provide a sub-electrode pattern including the sub-electrodes 5aa and 5ab and a masking metal layer pattern 6a while leaving the exposed portions of the stripe electrodes 4a as shown in FIG. 3B. Similarly as in the case of the first substrate 1a, the sub-electrodes 5ba and 5bb and a masking metal layer, if necessary, on the second substrate 1b are formed of an identical material in a common step at the same time to provide a sub-electrode pattern including the sub-electrodes 5ba and 5bb as shown in FIG. 3C.

In this embodiment of the display device of the present invention, on each of the substrates 1a and 1b, an alignment film (not shown) of, e.g., polyimide may be formed so as to cover at least the display and visible peripheral regions A and C, followed by a uniaxial aligning treatment (e.g., rubbing in one direction).

Then, the thus-prepared pair of substrates 1a and 1b are bonded to each other with the sealing agent 2 so that the stripe electrodes 4a and 4b form an matrix electrode with uniaxial aligning axes (of the alignment films for the substrates 1a and 1b) directed in parallel and in an identical direction.

Into a gap between the substrates 1a and 1b, a liquid crystal showing a chiral smectic phase may preferably be injected to fill the gap by a capillary action under vacuum (reduced pressure), thus preparing a liquid crystal display device according to the present invention.

In the case where a color liquid crystal display device is prevented, on one of the substrates 1a and 1b, a color filter comprising at least three color filter segments of red (R), green (G) and blue (B) is disposed. In this case, spacings between the (color) pixels in the display region A are also masked with the sub-electrodes 5aa and 5ab in combination with an additional light-interrupting film as desired.

In the above-described display device as shown in FIGS. 2–5, the entire visible peripheral region C is masked with the combination of the sub-electrodes 5aa, 5ab, 5ba and 5bb and the masking metal layer(s) 6a provided to the first and second substrates 1a and 1b. These sub-electrodes and masking metal layer(s) are formed of an identical material (e.g., Mo) at the same time in a common step (e.g., photolithographic (-etching) process), thus not requiring additional steps. Further, the masking (light-interruption) of the visible peripheral region C and the display region A can be performed uniformly due to the use of the identical material providing a homogeneous masking state, thus improving a display quality of the resultant display device.

Figure 6:
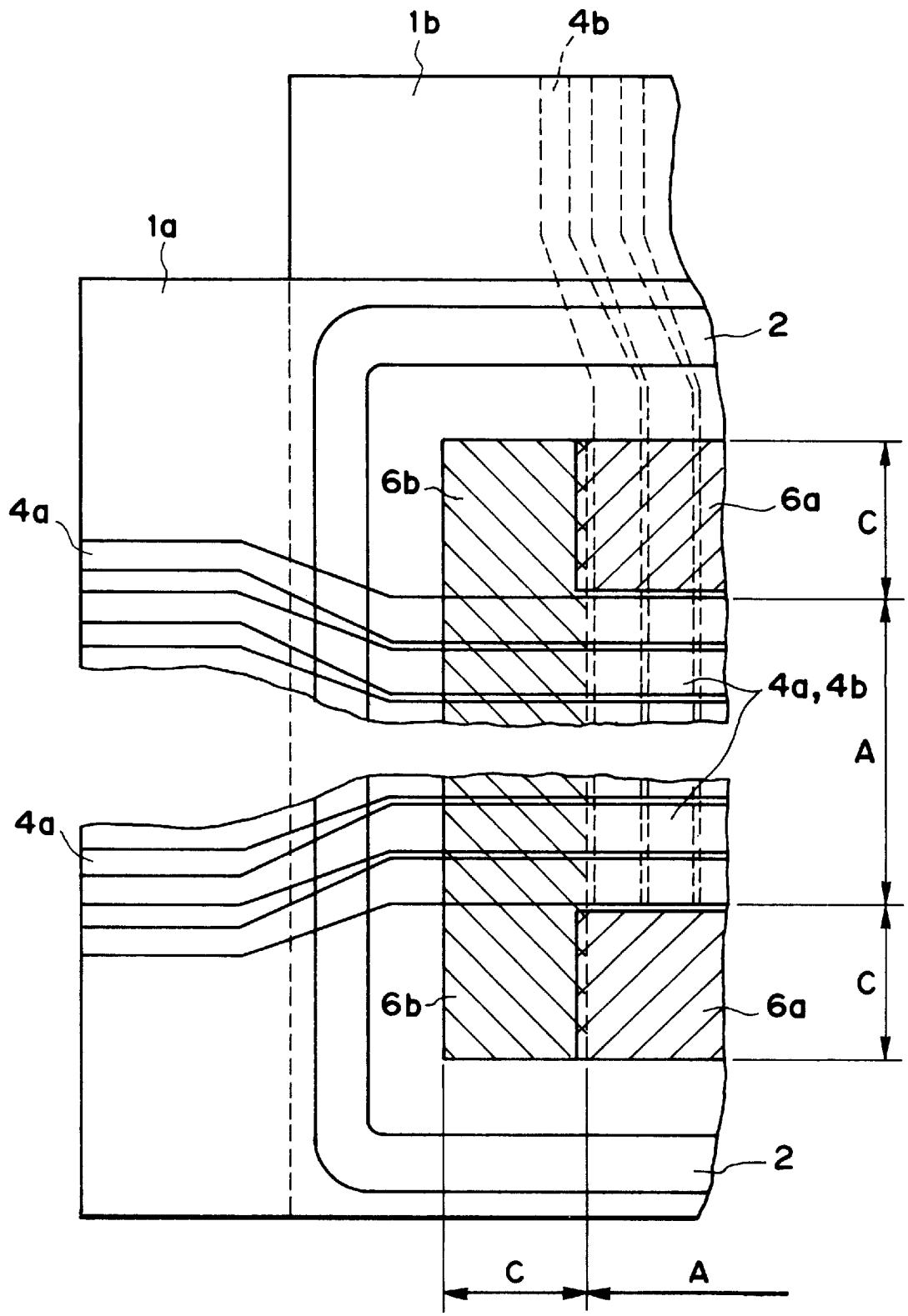
FIG. 6 is a schematic plan view showing an electrode arrangement adopted in another embodiment of a liquid crystal display device of the present invention.

FIG. 6 shows another embodiment of the liquid crystal display device of the present invention wherein an electrode arrangement of an upper left portion and lower left portion of the display device is illustrated.

Referring to FIG. 6, on each of substrates 1a and 1b, a plurality of stripe electrodes 4a and 4b are arranged in an electrode matrix similarly as in the case of the display device shown in FIGS. 2–5.

In the display region A, the stripe electrodes 4a and 4b are respectively coated with sub-electrodes (not shown) in the same manner as in FIGS. 3A and 4 so as to leave a plurality of pixels and to mask spacings between the pixels.

In the peripheral region C, the sub-electrodes may be formed or not formed on the stripe electrodes 4a and 4b in this embodiment.

In this embodiment, as shown in FIG. 6, the masking of the visible peripheral region C is performed by oppositely disposed (upper and lower) masking metal layers 6a via the display region A arranged on the first substrate 1a in parallel with the stripe electrodes 4a and oppositely disposed (left-hand and right-hand) masking metal layers 6b (only one of which (left-hand masking metal layer 6b) is shown in the figure) via the display region A arranged on the second substrate 1b in parallel with the stripe electrodes 4b, thus substantially preventing light-transmission in the visible peripheral region C.

In this embodiment, the masking metal layers 6a and 6b are formed of a material (identical to that for the associated sub-electrodes, respectively, at the same time in a common step similarly as in the case of those shown in FIGS. 2–5.

The masking metal layers 6a and 6b may preferably be electrically isolated from the stripe electrodes 4a and 4b (and the associated sub-electrodes), respectively.

According to this embodiment, the masking of the visible peripheral region C can be effected by the combination of the masking metal layers 6a and 6b on the first and second substrates 1a and 1b, respectively, together with the sub-electrodes formed in the visible peripheral region C, if any.

As described above, according to the present invention, the visible peripheral region located between the display region and the outer frame-shaped plate is effectively masked or light-interrupted without increasing production steps, thus providing a liquid crystal display device with a non-display region having a good external appearance at the periphery of the visible area of the display device.

What is claimed is:

1. A liquid crystal display device, comprising:

a pair of oppositely disposed first and second substrates each having thereon a plurality of transparent stripe-shaped electrodes so that the transparent stripe-shaped electrodes on the first and second substrates intersect each other to form an electrode matrix, each stripe-shaped electrode being provided with a sub-electrode superposed thereon, and a liquid crystal disposed between the first and second substrates so as to provide a plurality of pixels each at an intersection of the stripe-shaped electrodes on the first and second substrates, thereby forming a display region including the plurality of pixels and a visible peripheral region surrounding the display region, wherein in the visible peripheral region, the sub-electrodes on the first and second substrates are extended to mask the stripe-shaped electrodes and spacings between the stripe-shaped electrodes on the first and second substrates.

2. A device according to claim 1, wherein at least one of the first and second substrates is provided with a masking metal layer in the visible peripheral region so that said masking metal layer of said at least one of the first and second substrates are arranged to mask the visible peripheral region in combination with the sub-electrodes on the first and second substrates.

3. A device according to claim 1, wherein, in the display region, the pixels are arranged to leave pixel spacings therebetween which are masked with at least the sub-electrodes on the first and second substrates.

4. A device according to claim 2, wherein, on at least one of the first and second substrates, the sub-electrodes and said masking metal layer are formed and patterned at the same time.

5. A device according to claim 1, wherein each of the sub-electrodes on the first and second substrate comprises a metal electrode.

6. A device according to claim 1, wherein the liquid crystal comprises a chiral smectic liquid crystal.

7. A liquid crystal display device, comprising:

a pair of oppositely disposed first and second substrates each having thereon a plurality of transparent stripe-shaped electrodes so that the transparent stripe-shaped electrodes on the first and second substrates intersect each other to form an electrode matrix, each stripe-shaped electrode being provided with a sub-electrode superposed thereon, and a liquid crystal disposed between the first and second substrates so as to provide a plurality of pixels each at an intersection of the stripe-shaped electrodes on the first and second substrates, thereby forming a display region which includes the plurality of pixels and a visible peripheral region which surrounds the display region and includes, on at least one of the first and second substrates, a masking metal layer isolated from the transparent stripe-shaped electrodes on said at least one of the first and second substrates; wherein in the display region, the pixels are arranged to leave pixel spacings therebetween which are masked with at least the sub-electrodes on the first and second substrates, and in the visible peripheral region, the sub-electrodes on the first and second substrates are extended to mask the stripe-shaped electrodes and spacings between the stripe-shaped electrodes on the first and second substrates.

8. A device according to claim 7, wherein, on at least one of the first and second substrates, the sub-electrodes and the masking metal layer are formed and patterned at the same time.

* * * * *

UNITED STATES PATENT AND TRADEMARK OFFICE
CERTIFICATE OF CORRECTION

PATENT NO. : 6,184,962 B1
DATED : February 6, 2001
INVENTOR(S) : Masaaki Suzuki et al.

It is certified that error appears in the above-identified patent and that said Letters Patent is hereby corrected as shown below:

Column 3,
Line 60, "substrate" should read -- substrates --.

Column 4,
Line 40, "contacts" should read -- contact --.

Column 5,
Line 20, "substrate" should read -- substrates --.

Column 7,
Line 5, "length" should read -- length. --.

Column 10,
Line 3, "are" should read -- is --; and
Line 15, "substrate" should read -- substrates --.

Signed and Sealed this

Eighth Day of January, 2002

Attest:

Attesting Officer

JAMES E. ROGAN
Director of the United States Patent and Trademark Office